US010715495B2

(12) United States Patent
Kumar et al.

(10) Patent No.: US 10,715,495 B2
(45) Date of Patent: Jul. 14, 2020

(54) CONGESTION CONTROL DURING COMMUNICATION WITH A PRIVATE NETWORK (71) Applicant: NICIRA, INC., Palo Alto, CA (US)

(72) Inventors: Vasantha Kumar, Pune (IN); Amit Chopra, Pune (IN)

(73) Assignee: NICIRA, INC., Palo Alto, CA (US)

( * ) Notice: Subject to any disclaimer, the term of this patent is extended or adjusted under 35 U.S.C. 154(b) by 23 days.

(21) Appl. No.: 15/065,871

(22) Filed: Mar. 10, 2016

(65) Prior Publication Data
US 2017/0171087 A1 Jun. 15, 2017

(30) Foreign Application Priority Data

Dec. 15, 2015 (IN) .......................... 6721/CHE/2015

(51) Int. Cl.
H04L 29/06 (2006.01)
H04L 12/801 (2013.01)
H04L 12/925 (2013.01)
H04L 12/807 (2013.01)
H04L 12/46 (2006.01)

(52) U.S. Cl.
CPC ........ H04L 63/029 (2013.01); H04L 12/4641 (2013.01); H04L 47/11 (2013.01); H04L 47/196 (2013.01); H04L 47/27 (2013.01); H04L 47/722 (2013.01); H04L 63/0272 (2013.01)

(58) Field of Classification Search
CPC ... H04L 63/029; H04L 12/4641; H04L 47/11; H04L 47/196; H04L 47/27; H04L 47/722; H04L 63/0272
See application file for complete search history.

(56) References Cited

U.S. PATENT DOCUMENTS

| 2004/0125815 | A1* | 7/2004 | Shimazu | H04L 12/28 |
| 2004/0190449 | A1* | 9/2004 | Mannal | H04L 12/26 |
| 2008/0143512 | A1* | 6/2008 | Wakisaka | G08H 23/00 |
| 2009/0213850 | A1* | 8/2009 | Viger | H04L 12/56 |
| 2013/0163430 | A1* | 6/2013 | Gell | H04W 24/04 |
| 2014/0160928 | A1* | 6/2014 | Racz | H04W 28/02 370/235 |
| 2015/0009814 | A1* | 1/2015 | Wu | H04W 28/0289 |

(Continued)

FOREIGN PATENT DOCUMENTS

WO WO2015161990 * 10/2015

Primary Examiner — Ronald B Abelson
(74) Attorney, Agent, or Firm — SU IP Consulting (57) ABSTRACT Example methods are provided for a first endpoint to perform congestion control during communication with a second endpoint over a public network, the second endpoint being in a private network. The method may comprise generating a plurality of tunnel segments containing unreliable transport protocol data destined for the second endpoint; and determining whether congestion control is required based on a data amount of the plurality of tunnel segments and a congestion window associated with a tunnel connecting the first endpoint with the private network. The method may further comprise, in response to determination that congestion control is required, performing congestion control by dropping at least some of the plurality of tunnel segments; otherwise, sending the plurality of tunnel segments through the tunnel supported by the reliable transport protocol connection.

15 Claims, 6 Drawing Sheets (56) References Cited

U.S. PATENT DOCUMENTS

| | | | |
|---|---|---|---|
| 2015/0236966 A1* | 8/2015 | Francini | H04L 47/27 370/235 |
| 2015/0271073 A1* | 9/2015 | Saladi | H04L 47/12 |
| 2015/0281408 A1* | 10/2015 | Kwan | H04L 69/22 370/474 |
| 2015/0296418 A1* | 10/2015 | Szilagyi | H04W 36/0016 370/331 |
| 2016/0119288 A1* | 4/2016 | Ardeli | H04L 63/1416 726/12 |

* cited by examiner

CONGESTION CONTROL DURING COMMUNICATION WITH A PRIVATE NETWORK

RELATED APPLICATIONS

Benefit is claimed under 35 U.S.C. 119(a)-(d) to Foreign application Ser. No. 6721/CHE/2015 filed in India entitled "CONGESTION CONTROL DURING COMMUNICATION WITH A PRIVATE NETWORK", on Dec. 15, 2015, by Nicira, Inc., which is herein incorporated in its entirety by reference for all purposes.

BACKGROUND

Unless otherwise indicated herein, the approaches described in this section are not admitted to be prior art by inclusion in this section.

A private network, such as a virtual private network (VPN), is a way to use a public network infrastructure (e.g., the Internet) to provide remote users at remote locations with secure access to their organization's network. A VPN is generally less expensive to run compared to a dedicated network owned or leased by the one organization. Although shared public network infrastructure is used, privacy may be maintained through security procedures and tunnelling protocols. For example, using a tunnelling protocol, a remote user is able to access the private network from a remote location via a tunnel connecting the remote user with the private network.

In practice, the tunnel may be implemented over a reliable transport protocol connection, such as a Transmission Control Protocol (TCP) connection that guarantees data delivery. Any suitable data may be communicated over the tunnel, including User Dat gram Protocol (UDP) datagrams. Compared to TCP, UDP is an unreliable transport protocol that provides a connection-less service and does not guarantee data delivery, making it suitable for more delay-sensitive applications. However, communicating unreliable UDP data rams via a reliable TCP connection may adversely affect latency and performance.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
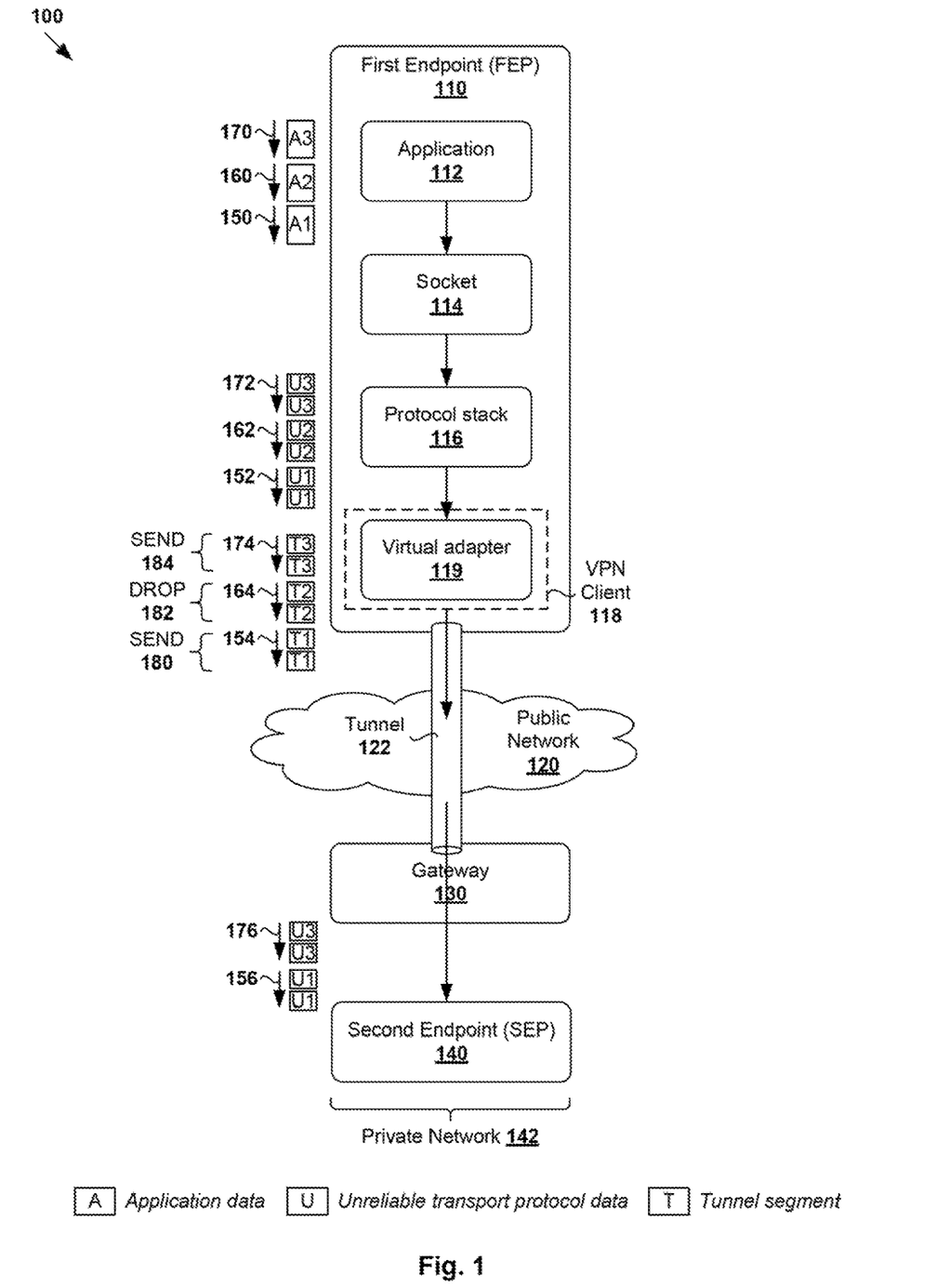
FIG. 1 is a schematic diagram illustrating an example network environment in which congestion control during communication with a private network is implemented.

The challenges of communicating unreliable transport protocol data, such as User Datagram Protocol (UDP) datagrams, will be described in more detail with reference to FIG. 1. In particular, FIG. 1 is a schematic diagram illustrating example network environment 100 in which congestion control during communication with private network 142 is implemented. It should be understood that network environment 100 may include additional and/or alternative components than that shown, depending on the desired implementation.

In the example in FIG. 1, network environment 100 includes multiple endpoints; such as first endpoint "FEP" 110 and second endpoint "SEP" 140. FEP 110 (also known as "remote user device," "remote client" and "client computing device") may be operated by a remote user at a location remote to private network 142. SEP 140 may represent a physical server or a virtualized computing instance (e.g., virtual machine) supported by the physical server in private network 142. For example, SEP 140 may provide various web-based services to FEP 110, such as to facilitate access to emails, files or applications on an organization's virtual private network (VPN) 142 by remote users (e.g., mobile workers, customers, business partners, etc.).

Gateway 130 associated with private network 142 may be any suitable interface unit to allow FEP 110 to interface with private network 142 over public network 120 (e.g., the Internet). In practice, gateway 130 may be one or more physical or virtual entities configured to operate as a firewall, router, switch, load balancer or any combination thereof, etc. Tunnel 122 is established between FEP 110 and gateway 130 over public network 120 to facilitate communication with SEP 140, which is in private network 142.

Transport Layer Security (TLS) or Secure Sockets Layer (SSL) cryptographic protocol (either of which is herein referred to as "SSL" protocol) may be used for extended security, application control, reliability and ease of management. SSL protocol works over Transmission Control Protocol Internet Protocol (TCP/IP) as a network medium to transfer secure data to destination SEP 140. In this case, tunnel 122 represents an SSL tunnel and private network 142 a Secure Sockets Layer Virtual Private Network (SSL VPN). Tunnel 122 may be built over a tunnel-level TCP connection between FEP 110 and gateway 130.

Data may be transferred through tunnel 122 in the form of "tunnel segments." For example, the tunnel segments may be SSL tunnel segments that each have a TCP header associated with the tunnel-level TCP connection between FEP 110 and gateway 130. In practice, the payload in each tunnel segment is encrypted to facilitate secure communication between FEP 110 and SEP 140 over public network 120. For example, security information for encryption and decryption (e.g., public key, private key, SSL certificate, etc.) may be exchanged when tunnel 122 is established Throughout the present disclosure, the term "tunnel segment" may refer to a segment that can be sent through tunnel 122. Further, the term "segment" may refer generally to a group of bits that can be transported together, and may be in another form, such as "frame", "message", "packet", etc.

FEP 110 executes application 112 (one shown for simplicity) having access to protocol stack 116 via socket 114. Protocol stack 116 is divided into several layers, such as transport layer (e.g., UDP layer), network layer (e.g., IP layer), etc. Socket 114 serves as a protocol-independent interface for application 112 to access protocol stack 116, such as by invoking socket system calls to open socket 114, sent data via socket 114, etc. To communicate with private network 142, private network client 118 (e.g., "VPN client") is installed on FEP 110. VPN client 118 implements virtual adapter 119 to communicate with private network 142 through tunnel 122.

In practice, VPN client 118 may operate in a user mode and virtual adapter 119 in a kernel mode. VPN client 118 may use any suitable approach to control input/output operations of virtual adapter 119, such as Input Output Control (IOCTL), etc. After tunnel 122 is established with gateway 130, virtual adapter 119 may "tunnel" through to private network 142. Further, socket 114, protocol stack 116 and virtual adapter 119 may be implemented by an operating system (not shown for simplicity) of FEP 110. Virtual adapter 119 is assigned with an IP address to communicate with private network 142. Throughout the present disclosure, the term "virtual adapter" (also known as "virtual network adapter") may refer generally to a network interface that is implemented by the execution of software instructions to simulate operations of a physical network adapter.

In the example in FIG. 1, application 112 may be a delay-sensitive application where missing data is preferable to waiting for delayed data. For example, application 112 may be used for audio or video communication, such as Voice over Internet Protocol (VOIP), Personal Computer over Internet Protocol (PCOIP), video streaming, etc. In this case, an "unreliable transport protocol" such as UDP may be used by protocol stack 116 to send UDP datagrams containing delay-sensitive application data. Unlike a reliable transport protocol such as TCP, UDP provides a simpler service with no, hand-shaking process for guaranteeing data delivery, ordering, etc. Since UDP is a connection-less protocol, it is not necessary for FEP 110 to establish an applications level TCP connection with SEP 140 prior to any data communication.

When FEP 110 communicates with SEP 140, delay-sensitive data from application 112 is formatted into UDP datagrams before they are sent through tunnel 122. In the example in FIG. 1, application 112 sends data (see "A1" 150, "A2" 160 and "A3" 170) via socket 114 at different times. Protocol stack 116 generates UDP datagrams (see "U1" 152, "U2" 162 and "U3" 172) containing respective application data. VPN client 118 then generates SSL tunnel segments (see "T1," 154, "T2" 164, "T3" 174) for transfer through tunnel 122. For example, a SSL tunnel segment may be generated by encapsulating a UDP datagram (i.e., payload) with a VPN header, SSL header, TCP header, outer IP header, outer layer 2 header, etc. This is also known as the "UDP over TCP" approach. The size of each tunnel segment may depend on a maximum transmission unit (MTU) supported by FEP 110, public network 120, private network 142 and SEP 140.

The use of UDP to send delay-sensitive data of application 112 has various advantages, such as lower computational overhead, reduced latency, etc. However, since tunnel 122 is built over a tunnel-level TCP connection, sending UDP datagrams over the TCP connection may negate the advantages of UDP. For example, according to a conventional approach, SSL tunnel segments (see "T1" 154, "T2" 164, "T3" 174) are buffered and queued before they are sent. In some cases, excessive buffering will result in significantly delay.

In one example scenario, if application 112 (e.g., VOIP) at FEP 110 sends data at 10 Megabits per second (Mbps) but tunnel 122 only supports a bandwidth of 5 Mbps, 5 Mb of data will be out-of-synchronization per second. Using the example in FIG. 1, second SSL tunnel segments (T2) 164 will have to be buffered and queued if there is insufficient bandwidth after first SSL tunnel segments (T1) 154 are sent through tunnel 122. This results in the delay and out-of-synchronization of second SSL tunnel segments (T2) 164 when they reach SEP 140, rendering them unusable because of their delay-sensitive nature. If this continues, subsequent third SSL tunnel segments (T3) 174 will also have to be buffered and queued, again rendering them unusable by the time they reach SEP 140. This problem is seen not only in VOIP applications, but also other UDP-based applications 112 that utilize TCP-based tunnel 122 to private network 142.

According to examples of the present disclosure, application performance may be improved by selectively performing congestion control to drop tunnel segments. For example, when it is determined that congestion control is required, tunnel segments may be dropped without being buffered. In this case, excess buffering that causes the out-of-synchronization problem discussed above may be avoided. In the following, UDP will be used as an example "unreliable transport protocol," UDP datagrams as example "unreliable transport protocol data," TCP as example "reliable transport protocol" and TCP connection as example "reliable transport protocol connection." It should be understood that examples of the present disclosure may be implemented using any other suitable "unreliable transport protocol" and "reliable transport protocol."

Figure 2:
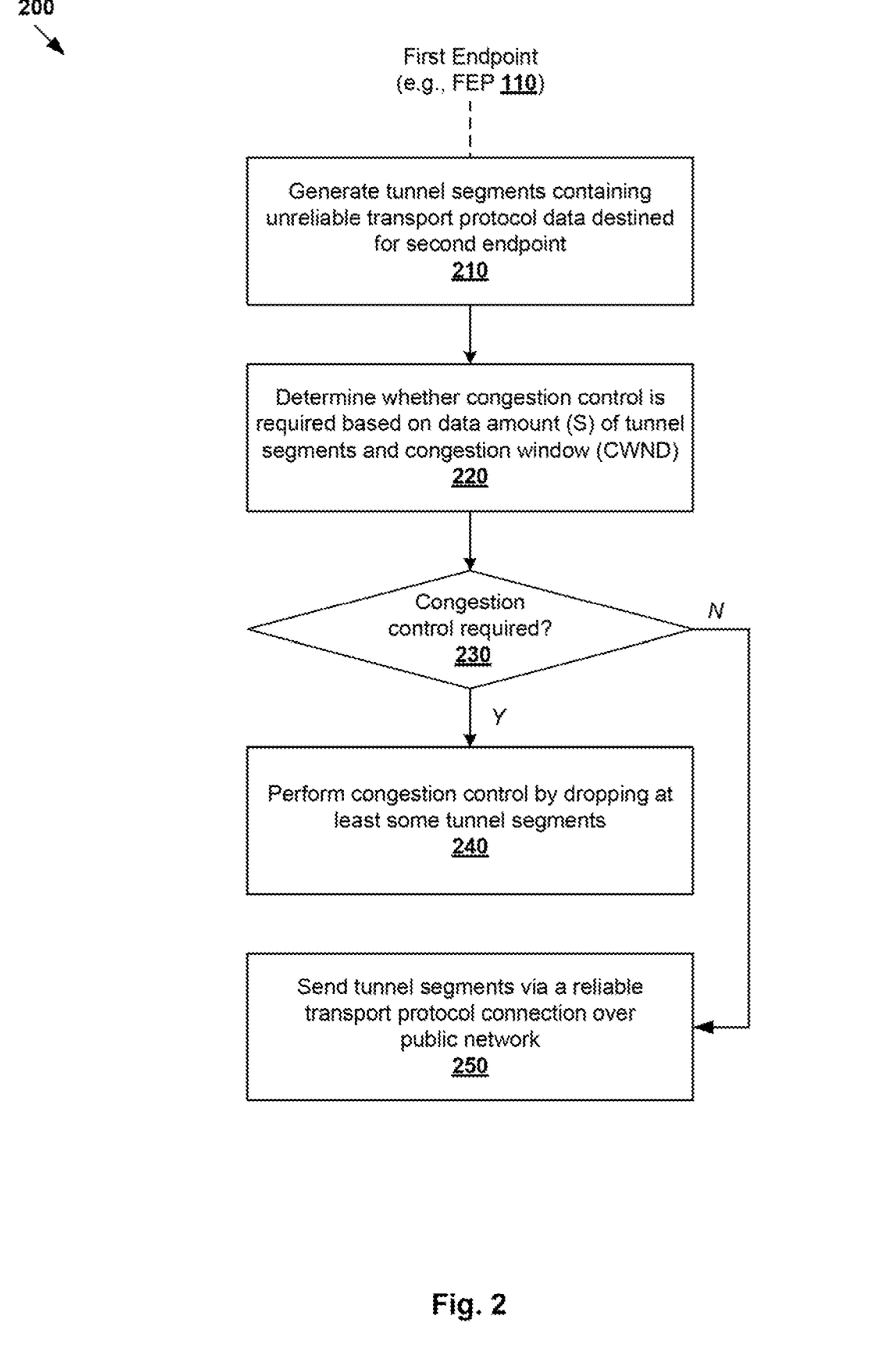
FIG. 2 is a flowchart of an example process for a first endpoint to perform congestion control during communication with a second endpoint in a private network.

In more detail, FIG. 2 is a flowchart of example process 200 for first endpoint 110 to perform congestion control during communication with second endpoint 140 in private network 142. Example process 200 may include one or more operations, functions, or actions illustrated by one or more blocks, such as 210 to 250. The various blocks may be combined into fewer blocks, divided into additional blocks, and/or eliminated depending on the desired implementation.

At 210 in FIG. 2, FEP 110 generates tunnel segments (e.g., SSL tunnel segments) containing unreliable transport protocol data (e.g., UDP datagrams) that are destined for SEP 140. As will be discussed further using FIG. 3 to FIG. 6, SSL tunnel segments may be generated using any suitable approach, such as SSL compression, VPN header encapsulation, SSL encryption, SSL header encapsulation, or any combination thereof, etc. In practice, an underlying tunnel protocol stack (e.g., SSL protocol stack; not shown in FIG. 1 for simplicity) that is accessible by VPN client 118 may generate the SSL tunnel segments from UDP datagrams.

At 220 in FIG. 2, FEP 110 determines whether congestion control is required based on a data amount of the tunnel segments and a congestion window associated with tunnel 122 connecting FEP 110 with private network 142. The term "congestion window" (CWND) may refer generally to a variable that sets a maximum data amount that can be sent via a reliable transport protocol connection (e.g., TCP connection) supporting tunnel 122. In practice, any "data amount" may be specified in bits, bytes, etc.

As will be described further using FIG. 3 to FIG. 6, the determination may involve comparing the data amount of the tunnel segments with an available data amount that can be sent through tunnel 122. For example, the available data amount may be a difference between CWND and a flight size (FS) that specifies the data amount that has been sent through tunnel 122 but not yet acknowledged. Flight size (FS) is also known as "bytes pending" or "bits pending," as well as "bytes in flight" or "bits in flight."

At 230 and 240 in FIG. 2, FEP 110 determines that congestion control is required and drops at least some of the tunnel segments. Otherwise (i.e., congestion control is not required), at 230 and 250 in FIG. 2, FEP 110 sends the tunnel segments through tunnel 122 via the reliable transport protocol connection (e.g., TCP connection).

In the example in FIG. 1, FEP 110 may decide to send first SSL tunnel segments (T1) 154 at 180 as well as third SSL tunnel segments (T3) 174 at 184, but drop second SSL tunnel segments (T2) 164 at 182 based on their respective congestion control requirements. As such, using example process 200, FEP 110 may send tunnel segments asynchronously depending on whether congestion control is required at a particular time. Second SSL tunnel segments (T2) 164 are not buffered for later transmission, but are dropped. This may in turn reduce the latency and likelihood of out-of-synchronization of the subsequent third SSL tunnel segments (T3) 174.

The asynchronous approach should be contrasted against the conventional synchronous approach that buffers tunnel segments until there they can be sent through tunnel 122. As discussed above, such buffering may be excessive and unnecessary due to the delay-sensitive nature of the UDP datagrams. In the example in FIG. 1, only, first SSL tunnel segments (T1) 154 and third SSL tunnel segments (T3) 174 are sent through tunnel 122. As such, only corresponding first UDP datagrams (U1) 156 and third UDP datagrams (U3) 176 are delivered to SEP 140. As used in the specification, the term "asynchronous" may generally refer to send events (e.g., Input Output (IO) operations) that occur intermittently depending on whether congestion control is required.

In the following, various examples will be discussed with reference to FIG. 3 to FIG. 7. In particular, an example outgoing communication will be described using FIG. 3 to FIG. 6, in which FEP 110 sends data to SEP 140 (i.e., "outbound" or "egress" communication from the perspective of FEP 110). An example incoming communication will be described using FIG. 7, in which FEP 110 receives data from SEP 140 (i.e., "inbound" or "ingress" communication from the perspective of FEP 110).

Example Outdoing Communication

Figure 3:
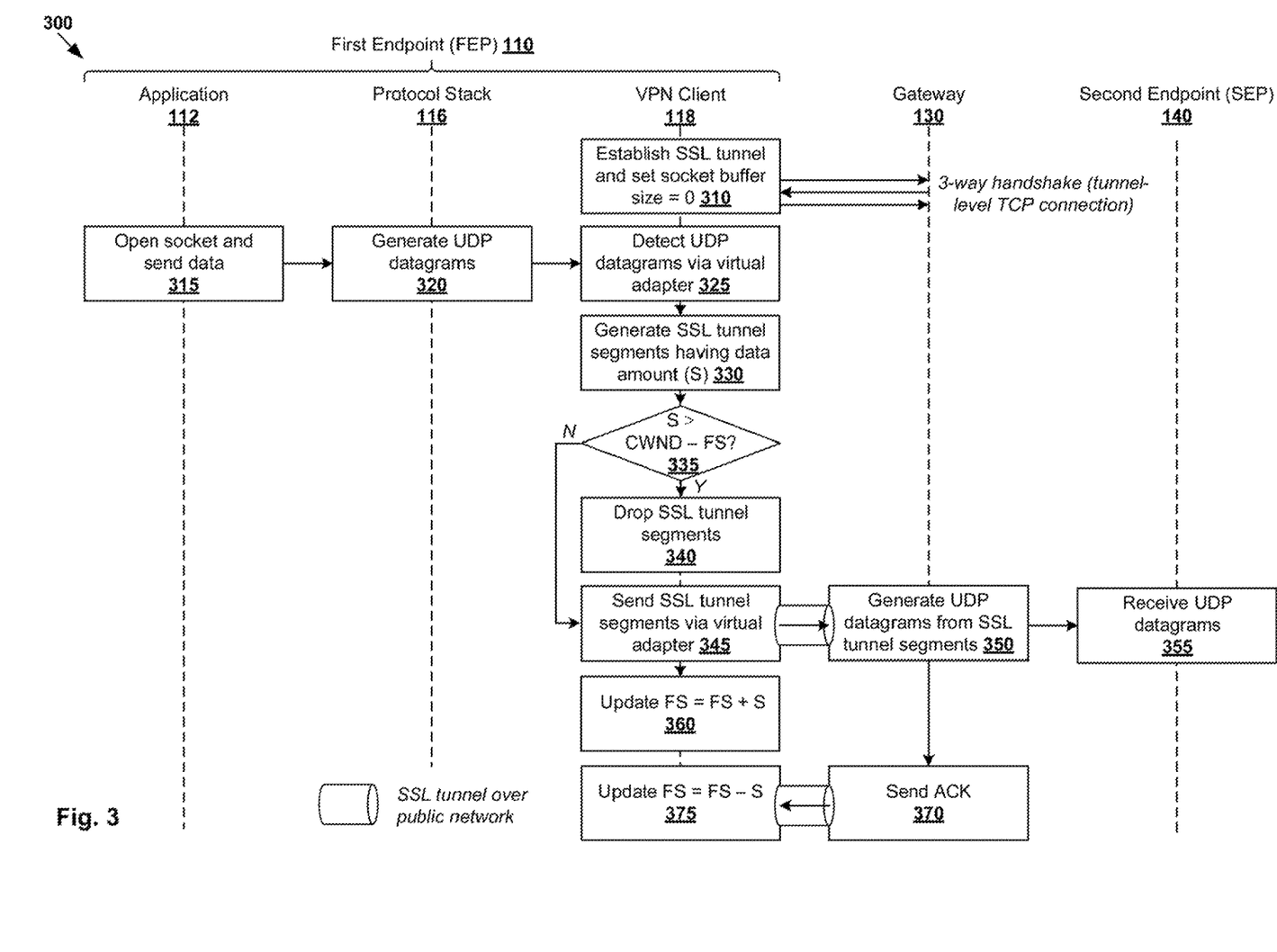
FIG. 3 is a flow diagram illustrating example communication in the network environment in FIG. 1 when the example process in FIG. 2 is implemented.

FIG. 3 is a flow diagram illustrating example communication 300 in network environment 100 in FIG. 1 when example process 200 in FIG. 2 is implemented. The example in FIG. 3 is illustrated using one or more operations, functions, or actions, such as 310 to 375 in FIG. 3. The various operations, functions, or actions may be combined, divided, and/or eliminated based upon the desired implementation.

At 310 in FIG. 3, prior to application 112 starting, VPN client 118 connects to private network 142 by establishing tunnel 122 (e.g., SSL tunnel) with gateway 130 to facilitate communication between FEP 110 and a destination in private network 142, such as SEP 140. For example, this may be initiated by a user operating VPN client 118. Any suitable approach may be used at 310 to support tunnel 122, such as establishing a tunnel-level TCP connection between FEP 110 and gateway 130. The tunnel-level TCP connection may be identified using a connection identifier (ID) and subsequently used by FEP 110 to communicate with private network 142.

For example, VPN client 118 may initiate the tunnel-level TCP connection establishment process by sending a synchronization (SYN) packet to gateway 130, which then responds with a synchronization-acknowledgment (SYN-ACK) packet. VPN client 118 then responds with an ACK packet to conclude the connection establishment process. Although one application 112 is shown as an example, it should be understood that multiple applications executing on FEP 110 may share the same tunnel-level TCP connection with gateway 130.

At 310 in FIG. 3, VPN client 118 also sets a socket buffer size of a socket layer (not shown for simplicity) supporting the tunnel-level TCP connection to zero. This should be contrasted with a static, non-zero socket buffer size that is used conventionally to buffer and queue tunnel segments until they can be sent through tunnel 122. According to this conventional approach, if the socket buffer size is set at a much higher value that the actual bandwidth of tunnel 122, there will be excessive buffering of data that results in significant delay. Using a zero socket buffer size, tunnel segments may be dropped when congestion control is required without being buffered for later transmission. Also, as will be explained further below, the socket buffer size is set to zero such that a send operation will be considered as completed after an ACK packet is received from destination SEP 140.

At 315 in FIG. 3, application 112 opens socket 114 to send application data destined for SEP 140 in private network 142. Application 112 may be a delay-sensitive application (e.g., VOIP, PCOIP, video streaming, etc.) that prefers data loss to delay. Socket system calls may be invoked by application 112 to open and send the data via socket 114. For example, opening a UDP socket may involve invoking socket (AF_INET, SOCK_DGRAM, 0), where "AF_INET" represents the IP address family (e.g., IP version 4 (IPv4), IP version 6 (IPv6), etc.) and "SOCK_DGRAM" represents a connection-less and unreliable datagram service.

At 320 in FIG. 3, in response to receiving the application data sent by application 112, protocol stack 116 generates unreliable transport protocol data in the form of UDP datagrams. Each UDP datagram includes a UDP header and a payload. The UDP header (e.g., 8 bytes) may carry source port associated with source PEP 110, a destination port associated with destination SEP 140, length of the UDP datagram, and a checksum for error detection. The payload contains any suitable portion of the delay-sensitive data sent by application 112.

Figure 4:
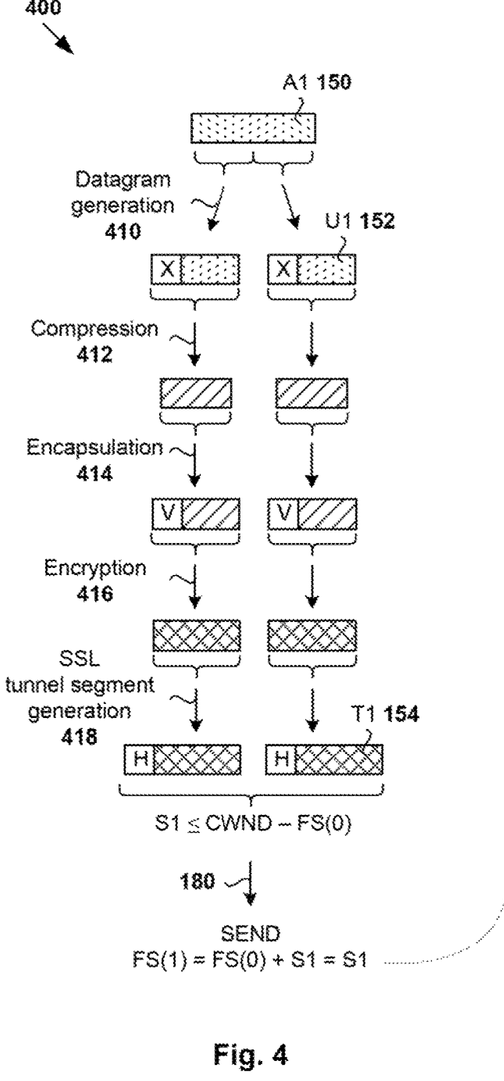
FIG. 4, which is a schematic diagram illustrating a first example process for a first endpoint to generate and send first SSL tunnel segments in FIG. 1.

At 325 and 330 in FIG. 3, in response to detecting the UDP datagrams via virtue adapter 119, VPN client 118 generates tunnel segments from the UDP datagrams. An example is shown in FIG. 4, which is a schematic diagram illustrating first example process 400 for first endpoint 110 to generate and send first SSL tunnel segments (T1) 154 in FIG. 1. As shown at 410 in FIG. 4, protocol stack 116 may generate first UDP datagrams (U1) 152 from first application data (A1) 150.

VPN client 118 may perform compression (see 412 in FIG. 4), encapsulation with a VPN header associated with private network 142 (see 414 and VPN header labelled "V" in FIG. 4), encryption (see 416 in FIG. 4) and SSL tunnel segment generation (see 418 in FIG. 4) to generate corresponding first SSL tunnel segments (T1) 154. Each first tunnel segment (T1) 154 is encapsulated with a tunnel-level TCP header (labelled "H" in FIG. 4) identifying the destination IP address and destination port number associated with gateway 130. It should be understood that any other approach than that shown in FIG. 4 may be used. For example, if UDP payloads such as VOIP and PCOIP are already compressed, the compression at 412 in FIG. 4 may be omitted to reduce central processing unit (CPU) overhead.

Referring to FIG. 3 again, at 335, VPN client 118 determines whether congestion control is required based on a data amount (S) of the tunnel segments and a congestion window (CWND) of the tunnel-level TCP connection established between FEP 110 and gateway 130. In one example, it is determined whether S>CWND−FS, where FS represents the amount of data (e.g., in bits, bytes, etc.) that has been sent but not acknowledged. The congestion control is to ensure that FEP 110 does not send data amount exceeding the available CWND−FS.

In practice; CWND is a sender-side limit representing the total number of unacknowledged bits/bytes that can be sent through tunnel 122. In practice, CWND may be set according to any suitable approach, such as a slow start algorithm defined in Request for Comments (RFC) 2581 by the Internet Engineering Task Force (IETF), etc. For example, according to the slow start algorithm, FEP 110 may set an initial value for CWND during the TCP connection establishment at 315 in FIG. 3, such as based on the maximum segment size (MSS) of sender FEP 110, a bandwidth-delay product (BDP) at that particular instant, etc. The BDP is the product of a bandwidth of tunnel 122 (in bits per second) and a round trip time (in seconds).

The value of CWND may be updated (e.g., by the underlying protocol stack of FEP 110) during the TCP connection. For example, CWND may be incremented based on ACK packets received by FEP 110 or decremented as segment drop is detected. Any suitable approach may be used to obtain the current value of CWND to determine whether congestion control is required at 335 in FIG. 3. For example, newer operating systems generally provide mechanism to collect TCP congestion statistics that include CWND, such as by invoking a system call supported by FEP 110. For example, Windows Application Programming Interface (API) includes system call GetPerTCPConnectionEStats( ) that may be used to obtain the current CWND value. Any other suitable operating system and system call may be used.

At 340 in FIG. 3, if congestion control is required (i.e., 5>CWND−FS), the tunnel segments will be dropped. Otherwise, at 345 in FIG. 3 the tunnel segments will be sent when congestion control is not required (i.e., S≤CWND−FS). Further, at 360 in FIG. 3, the flight size (FS) is incremented by the data, amount (5) of the tunnel segments that have been sent but not yet acknowledged.

Referring also to the example in FIG. 4 again, FEP 110 determines whether the congestion control condition of S1>CWND−FS(0) is satisfied. Here, S1=5 Mb (i.e., Megabits) is the total data amount of first SSL tunnel segments (T1) 154 (e.g., in bits), congestion window CWND=6 Mb and FS(0)=0 is the number of bits that are pending (i.e., sent but not acknowledged, or in flight) at that particular time. As such, congestion control is not required (i.e., 5≤6−0) and first SSL tunnel segments (T1) 154 are sent through tunnel 122. FEP 110 also increases the flight size as follows, FS(1)=FS(0)+S1=5 Mb for subsequent iteration of congestion control.

At 350 and 355 in FIG. 3, in response to receiving the tunnel segments through 122, gateway 130 generates UDP datagrams and sends them to SEP 140. For example, the generation may involve performing decapsulation of the TCP header of each tunnel segment, decryption, decapsulation of the VPN header, decompression, etc. This is to reverse the SSL VPN processing performed by VPN client 118 (see FIG. 4).

At 370 in FIG. 3, since tunnel 122 is supported by the tunnel-level TCP connection established at 310 in FIG. 3, gateway 130 sends ACK packets to VPN client 118 to acknowledge receipt of the tunnel segments sent by VPN client 118 at 350 in FIG. 3. At 375 in FIG. 3, VPN client 118 updates the value of FS by decreasing it by the data amount of the tunnel segments acknowledged, such as S1 in first example 400 in FIG. 4. This increases the available CWND−FS for subsequent transmission.

Figure 5:
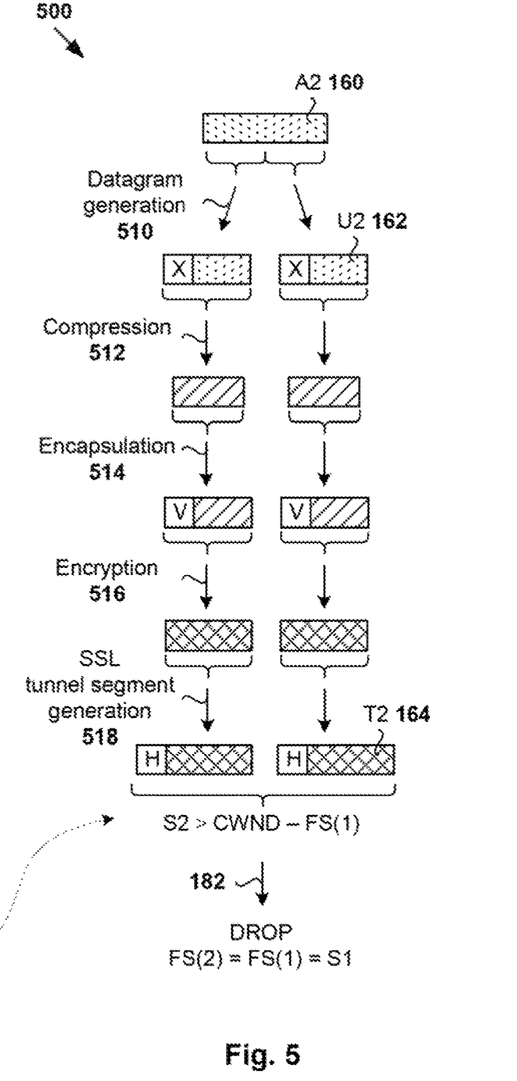
FIG. 5 is a schematic diagram illustrating a second example process for a first endpoint to generate and drop second SSL tunnel segments in FIG. 1.
Figure 6:
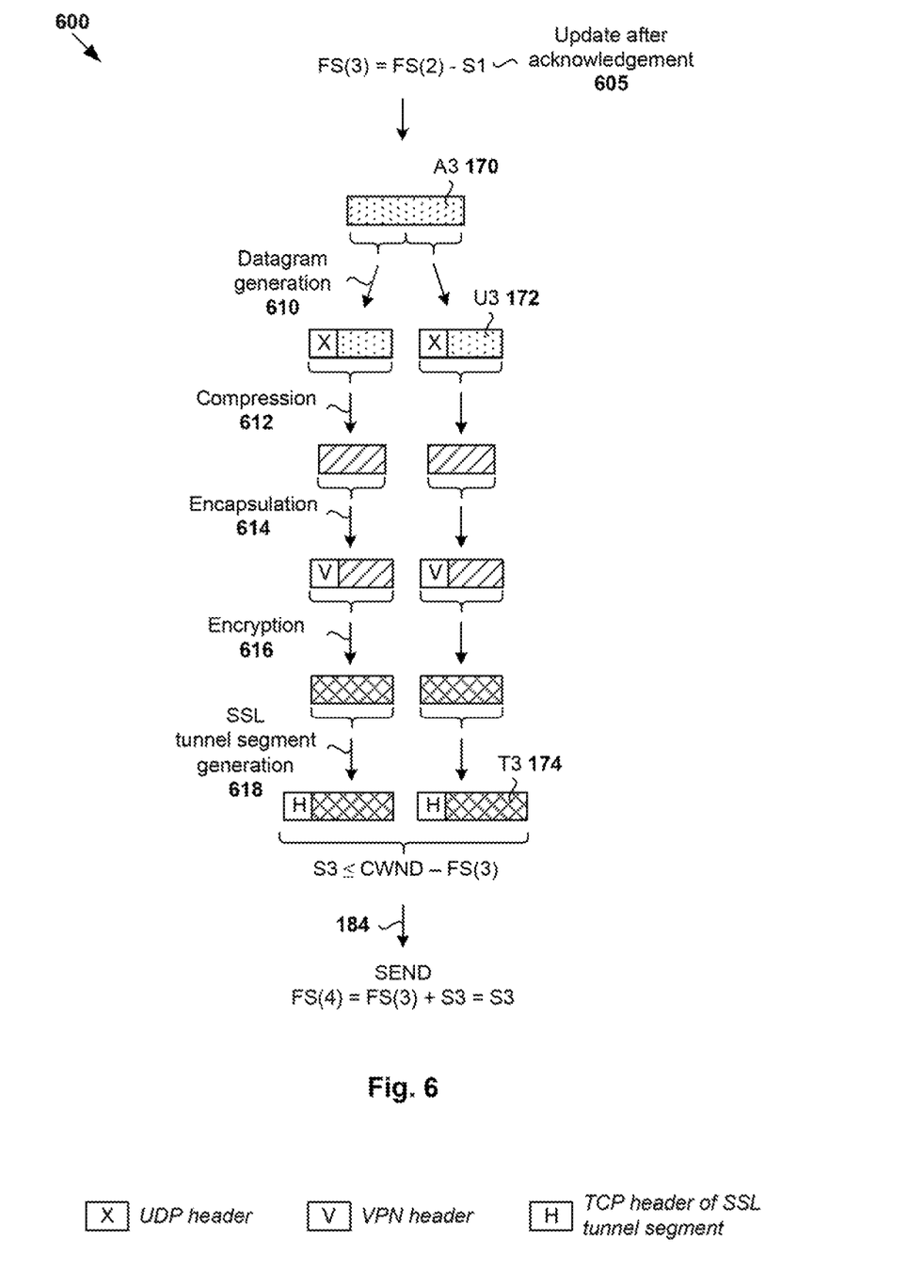
FIG. 6 is a schematic diagram illustrating a third example process for a first endpoint to generate and send third SSL tunnel segments in FIG. 1.

In practice, the ACK packets may not be received by VPN client 118 at 375 in FIG. 3 before subsequent tunnel segments, are generated at 330 in FIG. 3. Referring now to FIG. 5 and FIG. 6, an example scenario in which the ACK packets are received after second SSL tunnel segments (T2) 164 are generated, but before third SSL tunnel segments (T3) 174 are generated will be described. In this example scenario, congestion control results in second SSL tunnel segments (T2) 164 being dropped by VPN client 118.

In more detail, FIG. 5 is a schematic diagram illustrating second example process 500 for first endpoint 110 to generate and drop second SSL tunnel segments (T2) 164 in FIG. 1. As shown at 510 in FIG. 5, second UDP datagrams (U2) 162 are generated by protocol stack 116 from second application data (A2) 160. Similarly, VPN client 118 performs compression (see 512 in FIG. 5), VPN header encapsulation (see 514 in FIG. 5), encryption (see 516 in FIG. 5) and TCP header encapsulation (see 518 in FIG. 5) to generate second SSL tunnel segments (T2) 164 having data amount=S2. It should be understood that any other approach than that shown in FIG. 5 may be used. Similar to the example in FIG. 4, if UDP payloads such as VOIP and PCOIP are already compressed, the compression at 512 in FIG. 5 may be omitted to reduce the CPU overhead.

According to 335 in FIG. 3, VPN client 118 determines whether S2>CWND-FS(1), where S2 is the data amount of second SSL tunnel segments (T2) 164 and FS(1) is the flight size after first SSL tunnel segments (T1) 154 are sent but not acknowledged. For example, when S2=4 Mb, CWND=6 Mb and FS(1)=5 Mb, congestion control is required (i.e., 4>6−5). In this case, at 340 in FIG. 3, VPN client 118 performs congestion control by dropping second SSL tunnel segments (T2) 164. The flight size remains the same, i.e., FS(2)=FS(1)=5 Mb, which represents the number of bits of first SSL tunnel segments (T1) 154 that have been sent to gateway 130 but not yet acknowledged.

FIG. 6 is a schematic diagram illustrating third example process 600 for first endpoint 110 to generate and send third SSL tunnel segments (T3) 174 in FIG. 1. Unlike the second example in FIG. 5, ACK packets for first SSL tunnel segments (T1) 154 are received before third SSL tunnel segments (T3) 174 are generated or sent. At 605 in FIG. 6 for example, in response to receiving the ACK packets, VPN client 118 updates FS based on the data amount of associated first SSL tunnel segments (T1) 154 acknowledged by gateway 130, i.e., FS(3)=FS(2) S1=5−5=0.

Further in the third example in FIG. 6, VPN client 118 performs compression (see 612 in FIG. 6), VPN header encapsulation (see 614 in FIG. 6), encryption (see 616 in FIG. 6) and TCP header encapsulation (see 618 in FIG. 6) to generate third SSL tunnel segments (T3) 174 having data amount S3. As shown at 610 in FIG. 6, third SSL tunnel segments (T3) 174 are generated by protocol stack 116 from third UDP datagrams (U3) 172 containing third application data (A3) 170.

According to 335 in FIG. 3, VPN client 118 determines whether the congestion control condition of S3>CWND−FS(3) is satisfied, where S3 is the data amount of third SSL tunnel segments (T3) 174 and FS(3) is the current flight size. For example, when S3=4 Mb, CWND=6 Mb and FS(3)=0, congestion control is not required (i.e., 4≤6−0). As such, at 350 in FIG. 3, VPN client 118 sends third SSL tunnel segments (T3) 174 to gateway 130. The flight size is also updated to FS(4)=FS(3) S3=4 Mb, which represents the number of bits of third SSL tunnel segments (T3) 174 that have been sent to gateway 130 but not yet acknowledged.

In the above examples, sending first SSL tunnel segments (T1) 154 and third SSL tunnel segments (T3) 174 may involve invoking an asynchronous system call. One example system call is "AsynchronousSend(Saframebuffer, S, SendCompleteCallback)," where "SSLframebuffer" represents a buffer in which the tunnel segments are stored for delivery by the underlying protocol stack, "S" represents the data amount, and "SendCompleteCallback( )" is a function that is invoked when the send operation is considered as complete when ACK packets are received for the tunnel segments. This way, a send completion notification may be received through a callback on which the buffer allocated for the tunnel segments will be freed and corresponding flight size updated.

Although the example in FIG. 5 illustrates VPN client 118 dropping all second SSL tunnel segments (T2) 164, it should be understood that it is not necessary to do so. For example, in a partial drop approach, only some second SSL tunnel segments (T2) 164 may be dropped (e.g., S2−CWND+FS(1)=4-6+5=3 Mb) while the remainder (e.g., CWND−FS(1)=6−5=1 Mb) is sent to gateway 130. This serves to take advantage of the nonzero CWND FS(1)=1 Mb that can be utilized to, for example, reduce the number of dropped segments.

In practice, most UDP applications will intelligently adjust their bandwidth utilization depending on the dropped segments, with the aim of matching the bandwidth of tunnel 122 to improve the quality of application 112. Although an example congestion control scenario is described using FIG. 3, FIG. 4 and FIG. 5, it should be understood that there are other factors that cause congestion in network environment 100. For example, congestion control may adapt to different values of CWND during the TCP connection.

In practice, examples of the present disclosure may be implemented to work with existing approaches to adjust the CWND. For example, a decision to decrease CWND may be made by the underlying protocol stack independently depending on segment loss, BDP, etc. Further, a decision to increase CWND may depend on the number of ACK packets received. Using the latest value of the CWND as it changes throughout the TCP connection, adaptive congestion control that dynamically sends or drops tunnel segments may be implemented according to examples of the present disclosure.

Example Incoming Communication

Figure 7:
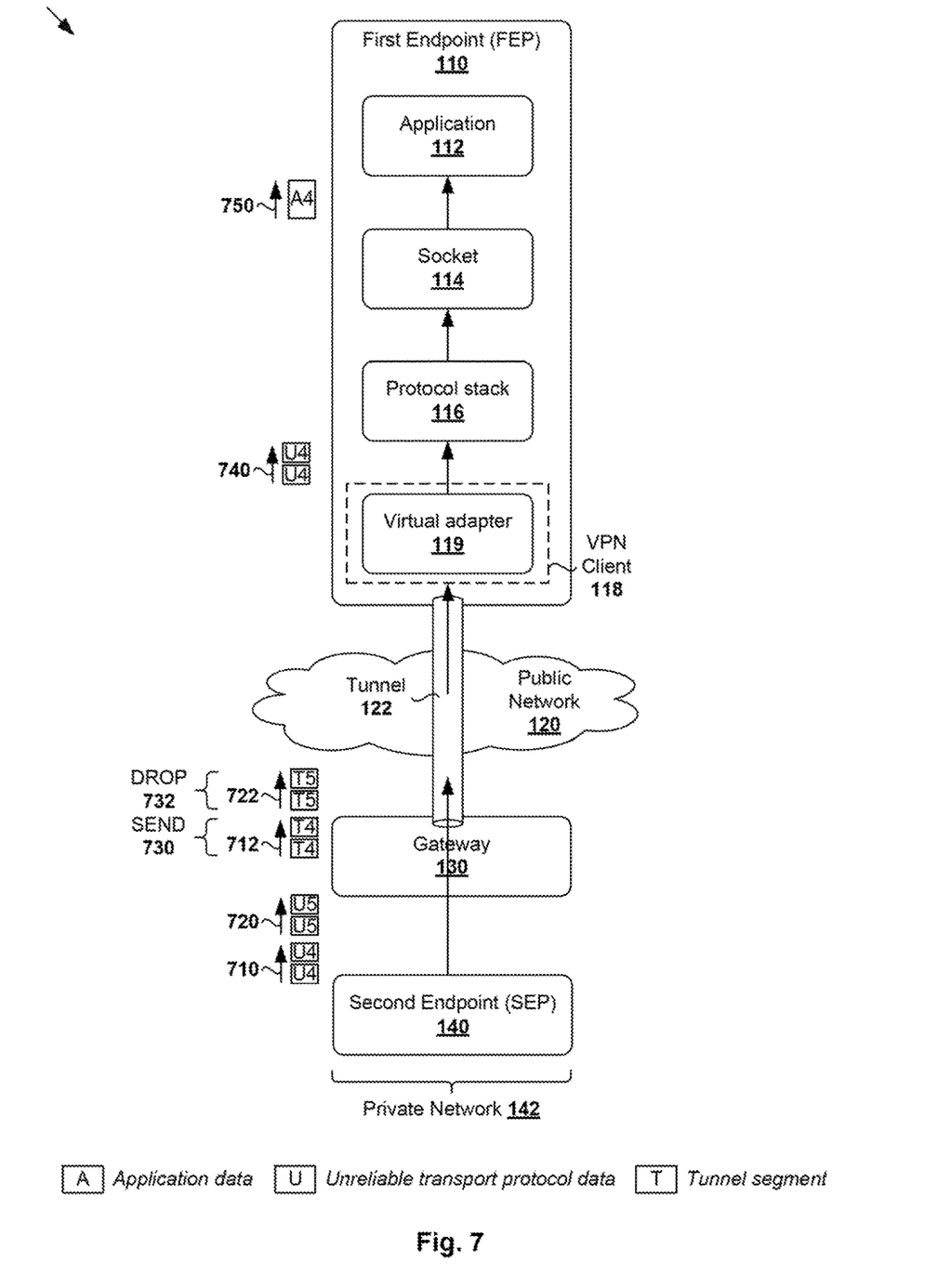
FIG. 7 is a schematic diagram illustrating an example network environment in which a first endpoint receives incoming data from a second endpoint.

The examples in FIG. 1 to FIG. 6 may also be applied to incoming communication from SEP 140 to FEP 110. In more detail, FIG. 7 is a schematic diagram illustrating example network environment 700 in which first endpoint 110 receives incoming data from second endpoint 140. It should be understood that network environment 700 may include additional and/or alternative components than that shown, depending on the desired implementation.

Similar to the example in FIG. 1, gateway 130 may selectively perform congestion control to drop UDP datagrams from SEP 140 that are destined for FEP 110. For example in FIG. 7, SEP 140 sends fourth UDP datagrams (U4) 710 and fifth UDP datagrams (U5) 720 at different time intervals. In response, gateway 130 generates fourth SSL tunnel segments (T4) 712 from fourth UDP datagrams (U4) 710, and fifth SSL tunnel segments (T5) 722 from fifth UDP datagrams (U5) 720.

According to the conventional approach, gateway 130 sends fourth SSL tunnel segments (T4) 712 followed by fifth SSL tunnel segments (T5) 722 in a synchronous manner. If the data amount (S5) of fifth SSL tunnel segments (T5) 722 exceeds the difference between the congestion window and flight size at that particular instant, fifth SSL tunnel segments (T5) 722 will be buffered at the socket layer (i.e., non-zero socket buffer size) and queued while waiting for their turn to be sent.

According to examples of the present disclosure, gateway 150 may send fourth SSL tunnel segments (T4) 712, but drop fifth SSL tunnel segments (T5) 722 if congestion control is required for the latter. As such, instead of buffering and queuing fifth SSL tunnel segments (T5) 722, they are simply not sent because delay is not tolerable for the delay-sensitive data in those segments 722. This also reduces latency for subsequent SSL tunnel segments generated by gateway 130. Blocks 330 to 345, 360 and 375 in FIG. 3 may be implemented by gateway 130 during congestion control.

At destination PEP 110, fourth SSL tunnel segments (T4) 712 are received via virtual adapter 119, but not fifth SSL tunnel segments (T5) 722. In this case, VPN client 118 generates and sends fourth UDP datagrams (U4) 740 to protocol stack 116. In turn, protocol stack 116 reassembles application data (A4) 750 in fourth UDP datagrams (U4) 740 for delivery to application 112.

The above examples can be implemented by hardware (including hardware logic circuitry), software or firmware or a combination thereof. The above examples may be implemented by any suitable network device, computer system, etc., which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc).

The dr a rigs are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first endpoint to perform congestion control during communication with a second endpoint over a public network, the second endpoint being in a private network, the method comprising:
    establishing a reliable transport protocol connection with a gateway associated with the private network;
    setting a socket buffer size of a socket layer for the reliable transport protocol connection to zero;
    generating a plurality of tunnel segments containing unreliable transport protocol data destined for the second endpoint, wherein the plurality of tunnel segments are for a tunnel connecting the first endpoint with the private network and supported by the reliable transport protocol connection;
    determining whether congestion control is required prior to sending the plurality of tunnel segments through the tunnel by:
        calculating an available data amount that can be sent via the tunnel based on comparing a congestion window and a flight size, wherein the congestion window sets a maximum data amount that can be sent via the tunnel, and the flight size represents an in flight data amount that has been sent via the tunnel but not yet acknowledged; and
    in response to a data amount of the plurality of tunnel segments exceeding the available data amount, performing congestion control by dropping at least some of the plurality of tunnel segments without buffering the at least some of the plurality of tunnel segments for later transmission; otherwise, sending the plurality of tunnel segments through the tunnel supported by the reliable transport protocol connection.

2. The method of claim 1, wherein the method further comprises:
    in response to determination that congestion control is not required, increasing the flight size by the data amount of the plurality of tunnel segments, thereby decreasing the available data amount.

3. The method of claim 1, wherein the method further comprises:
    receiving one or more acknowledgement packets for the plurality of tunnel segments; and
    decreasing the flight size by the data amount of the plurality of tunnel segments, thereby increasing the available data amount.

4. The method of claim 1, wherein the unreliable transport protocol data comprises one or more User Datagram Protocol (UDP) datagrams generated from delay-sensitive data sent by an application executing on the first endpoint; and the reliable transport protocol connection is Transmission Control Protocol (TCP) connection.

5. The method of claim 1, wherein the tunnel is a secure sockets layer (SSL) tunnel, the plurality of tunnel segments are SSL tunnel segments and the private network is a virtual private network (VPN).

6. A non-transitory computer-readable storage medium that includes a set of instructions which, in response to execution by a processor of a first endpoint, cause the processor to perform congestion control during communication with a second endpoint over a public network, the second endpoint being in a private network, the method comprising:
    establishing a reliable transport protocol connection with a gateway associated with the private network;
    setting a socket buffer size of a socket layer for the reliable transport protocol connection to zero;
    generating a plurality of tunnel segments containing unreliable transport protocol data destined for the second endpoint, wherein the plurality of tunnel segments are for a tunnel connecting the first endpoint with the private network and supported by the reliable transport protocol connection;
    determining whether congestion control is required prior to sending the plurality of tunnel segments through the tunnel by:
        calculating an available data amount that can be sent via the tunnel based on comparing a congestion window and a flight size, wherein the congestion window sets a maximum data amount that can be sent via the tunnel, and the flight size represents an in flight data amount that has been sent via the tunnel but not yet acknowledged; and
    in response to a data amount of the plurality of tunnel segments exceeding the available data amount, performing congestion control by dropping at least some of the plurality of tunnel segments without buffering the at least some of the plurality of tunnel segments for later transmission; otherwise, sending the plurality of tunnel segments through the tunnel supported by the reliable transport protocol connection.

7. The non-transitory computer-readable storage medium of claim 6, wherein the method further comprises:
    in response to determination that congestion control is not required, increasing the flight size by the data amount of the plurality of tunnel segments, thereby decreasing the available data amount.

8. The non-transitory computer-readable storage medium of claim 6, wherein the method further comprises:
receiving one or more acknowledgement packets for the plurality of tunnel segments; and
decreasing the flight size by the data amount of the plurality of tunnel segments, thereby increasing the available data amount.

9. The non-transitory computer-readable storage medium of claim 6, wherein the unreliable transport protocol data comprises one or more User Datagram Protocol (UDP) datagrams generated from delay-sensitive data sent by an application executing on the first endpoint; and the reliable transport protocol connection is Transmission Control Protocol (TCP) connection.

10. The non-transitory computer-readable storage medium of claim 6, wherein the tunnel is a secure sockets layer (SSL) tunnel, the plurality of tunnel segments are SSL tunnel segments and the private network is a virtual private network (VPN).

11. An endpoint, being a first endpoint, configured to perform congestion control during communication with a second endpoint over a public network, the second endpoint being in a private network, comprising:
a processor; and
a non-transitory computer-readable medium having stored thereon instructions that, when executed by the processor, cause the processor to implement a private network client and a virtual adapter, wherein the private network client is to:
establish a reliable transport protocol connection with a gateway associated with the private network;
set a socket buffer size of a socket layer for the reliable transport protocol connection to zero;
generate a plurality of tunnel segments containing unreliable transport protocol data destined for the second endpoint, wherein the plurality of tunnel segments are for a tunnel connecting the first endpoint with the private network and supported by the reliable transport protocol connection;
determine whether congestion control is required prior to sending the plurality of tunnel segments through the tunnel by:
calculating an available data amount that can be sent via the tunnel based on comparing a congestion window and a flight size, wherein the congestion window sets a maximum data amount that can be sent via the tunnel, and the flight size represents an in flight data amount that has been sent via the tunnel but not yet acknowledged; and
in response to a data amount of the plurality of tunnel segments exceeding the available data amount, perform congestion control by dropping at least some of the plurality of tunnel segments without buffering the at least some of the plurality of tunnel segments for later transmission; otherwise, send, via the virtual adapter, the plurality of tunnel segments to the gateway through the tunnel supported by the reliable transport protocol connection.

12. The endpoint of claim 11, wherein the instructions cause the processor to implement the private network client to:
in response to determination that congestion control is not required, increase the flight size by the data amount of the plurality of tunnel segments, thereby decreasing the available data amount.

13. The endpoint of claim 11, wherein the instructions cause the processor to implement the private network client to:
receive, via the virtual adapter, one or more acknowledgement packets for the plurality of tunnel segments; and
decrease the flight size by the data amount of the plurality of tunnel segments, thereby increasing the available data amount.

14. The endpoint of claim 11, wherein the unreliable transport protocol data comprises one or more User Datagram Protocol (UDP) datagrams generated from delay-sensitive data sent by an application executing on the first endpoint; and the reliable transport protocol connection is Transmission Control Protocol (TCP) connection.

15. The endpoint of claim 11, wherein the tunnel is a secure sockets layer (SSL) tunnel, the plurality of tunnel segments are SSL tunnel segments and the private network is a virtual private network (VPN).

* * * * *